(12) United States Patent
Narita et al.

(10) Patent No.: US 9,568,936 B2
(45) Date of Patent: Feb. 14, 2017

(54) PHASED ARRAY ANTENNA AND PHASE CONTROL METHOD THEREFOR

(75) Inventors: Takanori Narita, Tokyo (JP); Kenichi Amma, Tokyo (JP); Fumiya Tsukakoshi, Tokyo (JP); Morito Ohno, Nagoya (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 644 days.

(21) Appl. No.: 14/113,096

(22) PCT Filed: Jul. 13, 2012

(86) PCT No.: PCT/JP2012/067920
§ 371 (c)(1),
(2), (4) Date: Oct. 21, 2013

(87) PCT Pub. No.: WO2013/015137
PCT Pub. Date: Jan. 31, 2013

(65) Prior Publication Data
US 2014/0035694 A1 Feb. 6, 2014

(30) Foreign Application Priority Data

Jul. 27, 2011 (JP) .................. 2011-164520

(51) Int. Cl.
*G01S 5/02* (2010.01)
*G05F 5/00* (2006.01)
(Continued)

(52) U.S. Cl.
CPC ............ *G05F 5/00* (2013.01); *H01Q 1/288* (2013.01); *H01Q 1/521* (2013.01); *H01Q 3/26* (2013.01); *H01Q 23/00* (2013.01); *H04B 7/04* (2013.01)

(58) Field of Classification Search
CPC ........... G05F 5/00; H01Q 1/288; H01Q 1/521; H01Q 3/26; H01Q 23/00; H04B 7/04
(Continued)

(56) References Cited

U.S. PATENT DOCUMENTS 3,005,168 A * 10/1961 Fye .................. H01P 1/184
333/161
4,227,194 A * 10/1980 Herman .............. G01S 13/9017
342/25 E
(Continued)

FOREIGN PATENT DOCUMENTS

JP 11-145725 5/1999
JP 2001-309581 11/2001
(Continued)

OTHER PUBLICATIONS

Decision to Grant a Patent issued May 26, 2015 in corresponding Japanese patent application No. 2011-164520.
(Continued)

*Primary Examiner* — Frank J McGue
(74) *Attorney, Agent, or Firm* — Wenderoth, Lind & Ponack, L.L.P.

(57) ABSTRACT

In a phased array antenna that has a configuration in which a plurality of antenna panels, in each of which a plurality of antenna elements are arrayed, are connected in the form of a plane and that radiates power transmission microwaves in the arrival direction of a pilot signal sent from an electric-power receiving facility (rectenna system), by controlling the phases of signals input to and output from the antenna elements. An arithmetic processing section, which is provided in each of the antenna panels, calculates the phase shifts of power transmission microwaves to be radiated from the antenna elements. Then, the phase information indicating the phase shifts calculated by the arithmetic processing section is sent to at least three adjacent antenna panels by a transmission and reception section provided in each of the antenna panels.

5 Claims, 9 Drawing Sheets

(51) Int. Cl.
*H01Q 1/28* (2006.01)
*H01Q 1/52* (2006.01)
*H01Q 3/26* (2006.01)
*H01Q 23/00* (2006.01)
*H04B 7/04* (2006.01)

(58) Field of Classification Search
USPC .......................................................... 342/369
See application file for complete search history.

(56) References Cited

U.S. PATENT DOCUMENTS

| | | | | |
|---|---|---|---|---|
| 4,652,880 A | * | 3/1987 | Moeller | H01Q 3/40 333/128 |
| 4,717,918 A | * | 1/1988 | Finken | H01Q 3/32 342/368 |
| 2001/0035207 A1 | | 11/2001 | Mikami et al. | |

FOREIGN PATENT DOCUMENTS

| | | |
|---|---|---|
| JP | 2002-100919 | 4/2002 |
| JP | 2004-325162 | 11/2004 |
| JP | 2005-506788 | 3/2005 |
| JP | 2006-287451 | 10/2006 |
| JP | 2006-304205 | 11/2006 |
| WO | 03/036756 | 5/2003 |

OTHER PUBLICATIONS

International Search Report issued Oct. 16, 2012 in International (PCT) Application No. PCT/JP2012/067920.

* cited by examiner

| | | |
|---|---|---|
| A | C1 | ⋮ |
| A | WAITING | WAITING |
| A (C2) | ? | WAITING | WAITING |
| A | B | ? | WAITING |
| A | A | A | A |

| | | |
|---|---|---|
| A | C1 | ⋮ |
| A ⇒ A | A | WAITING |
| A (C2) | ↑ ? | WAITING | WAITING |
| A | B | ? | WAITING |
| A | A | A | A |

PHASED ARRAY ANTENNA AND PHASE CONTROL METHOD THEREFOR

TECHNICAL FIELD

The present invention relates to a phased array antenna to be applied to an SSPS (Space Solar Power System), for example, and, in particular, to a phased array antenna capable of controlling the direction of a power transmission beam toward an electric-power receiving facility (rectenna system) with a high degree of accuracy, as well as a phase control method therefor.

BACKGROUND ART

In recent years, environmental issues, such as global warming, and energy issues, such as depletion of fossil fuels, have been highlighted as carbon dioxide emissions caused by the use of fossil fuels increase. Therefore, the demand for clean energy is rising every year, and one solution to those issues is an SSPS scheme.

Figure 8:
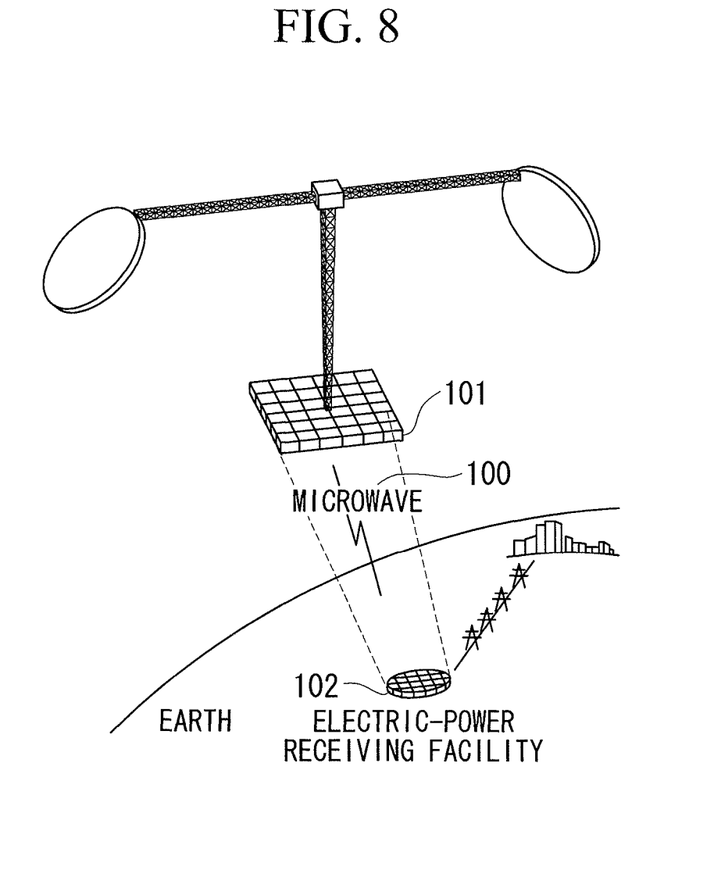
FIG. 8 is an explanatory diagram showing a space solar power system.

In an SSPS scheme, as shown in FIG. 8, an artificial satellite equipped with huge solar panels is launched into space above the equator, and electric power generated from sunlight is converted into microwaves by transmission modules provided in the solar panels. Then, microwaves 100 are sent from a microwave transmitting section 101 to an electric-power receiving facility (rectenna system) 102 provided on the ground, are then re-converted into electric power on the ground and are utilized.

Thus, clean energy can be stably supplied without depending on the weather and time zone, which are drawbacks of solar power generation. There are technical problems in realizing this scheme, such as bulk electric-power transmission, microwave-beam control, and reducing operating costs, and an example method for solving those problems is to use a laminated active integrated antenna (Active Integrated Antenna: AIA) for the microwave transmitting section 101. Furthermore, in order to achieve even higher efficiency in power transmission, one approach that is being considered is to provide a retrodirective function in the laminated active integrated antenna.

The retrodirective function is a function in which a pilot signal (guide signal) sent from the electric-power receiving facility (rectenna system) 102 provided on the ground is received by a power transmission antenna provided in the microwave transmitting section 101, and phase information of the received pilot signal is reflected in the transmission waves radiated from the power transmission antenna, so that the transmission waves are directed in the arrival direction of the pilot signal.

Furthermore, in the power transmission antenna used in SSPS, two-dimensionally-arrayed antenna panels each about one-meter square are connected at connection points, forming a large-area antenna. There is a case in which, when the large-area antenna is bent at the connection points, the phase planes of microwaves radiated from the antenna panels are different, and spurious waves with a high electric-power level are radiated onto points other than the target point; therefore, methods for aligning the phase planes have been proposed.

For example, PTL 1 discloses an example retrodirective function in which the distances between an antenna reference line perpendicular to the arrival direction of the pilot signal and antenna elements are calculated based on arrival-direction angles between the arrival direction of the pilot signal and the antenna panels, and phase shifts of microwaves to be radiated from the antenna elements are set and corrected according to the calculated distances.

CITATION LIST

Patent Literature

{PTL 1} Japanese Unexamined Patent Application, Publication No. 2006-287451

SUMMARY OF INVENTION

Technical Problem

With the above-described method disclosed in PTL 1, starting from a panel serving as a reference, the phase shifts of microwaves to be output from antenna panels adjacent to the reference panel are sequentially set and corrected.

When the phase shift is set in each antenna panel, if a failure occurs in the communication function of another antenna panel, the phase shift cannot be sent to other antenna panels adjacent to that antenna panel, and the communication failure in one of the antenna panels may affect the other antenna panels. Furthermore, if one of the antenna panels sends an incorrect phase shift, panels adjacent to that antenna panel receive the incorrect phase shift, and thus the incorrect phase shift may be propagated to other antenna panels.

The present invention has been made in view of such circumstances, and an object thereof is to provide a phased array antenna in which, even if an abnormality occurs in information transmission performed by an antenna panel, it is possible to prevent the influence of the abnormality from being propagated to other antenna panels, and to provide a phase control method therefor.

Solution to Problem

In order to solve the above-described problems, the phased array antenna and the phase control method therefor of the present invention employ the following solutions.

According to a first aspect, the present invention provides a phased array antenna that has a configuration in which a plurality of antenna panels, in each of which a plurality of antenna elements are arrayed, are connected in the form of a plane and that radiates signals in an arrival direction of a pilot signal sent from an electric-power receiving facility (rectenna system), by controlling phases of signals input to and output from the antenna elements, the phased array antenna including: a calculation part that is provided in each of the antenna panels and that calculates the phase shifts of signals to be radiated from the antenna elements; a reception part that is provided in each of the antenna panels and that receives calculation information used for the phase shift calculation performed by the calculation part, from an adjacent antenna panel among the antenna panels; and a transmission part that is provided in each of the antenna panels and that sends the calculation information obtained through the calculation performed by the calculation part to at least three other adjacent antenna panels among the antenna panels.

According to this configuration, the phased array antenna has a configuration in which a plurality of antenna panels, in each of which a plurality of antenna elements are arrayed, are connected in the form of a plane and radiates signals in the arrival direction of a pilot signal sent from an electric-power receiving facility (rectenna system), by controlling the phases of signals input to and output from the antenna elements.

Then, the phase shifts of signals to be radiated from the antenna elements are calculated by the calculation part provided in each of the antenna panels. The calculation part calculates the phase shifts by using calculation information sent from one of the adjacent antenna panels, and the calculation information is received by the reception part provided in each of the antenna panels.

Note that the signals are, for example, power transmission microwaves, and the calculation information is, for example, information indicating the phase shifts calculated by the calculation part.

The calculation information calculated by the calculation part is sent to at least three other adjacent antenna panels by the transmission part provided in each of the antenna panels.

Here, in a case where the calculation information is sent to two or fewer of the adjacent antenna panels, if a failure occurs in the communication function of an antenna panel, there is a possibility that the calculation information will not be sent to an antenna panel that is adjacent to the antenna panel having a failure in the communication function and that has no failure in the communication function.

However, when the calculation information is sent to at least three other adjacent antenna panels, a transmission path is redundantly provided, and thus the calculation information is sent by bypassing the antenna panel having a failure in the communication function; therefore, it is possible to avoid a situation in which the calculation information will not be sent to the antenna panel having no failure in the communication function.

Therefore, according to this configuration, even if an abnormality occurs in information transmission performed by an antenna panel, the influence of the abnormality can be prevented from being propagated to the other antenna panels.

In the above-described first aspect, it is preferable that, after the calculation information is received from two or more adjacent antenna panels among the antenna panels, the calculation part perform multiple calculations for the respective items of received calculation information and set the calculation information as a result of the calculations via a majority decision; and the transmission part send the calculation information set via the majority decision to the adjacent antenna panels among the antenna panels.

According to this configuration, after the antenna panel receives the calculation information from two or more of the adjacent antenna panels, the calculation part performs multiple calculations for the respective items of received calculation information and sets calculation information as the result of the calculations via a majority decision. Specifically, if different items of calculation information are obtained as the results of the calculations, identical items of calculation information that are more numerous are set as correct calculation information. Note that the identical items of calculation information include, in addition to items of calculation information that are exactly the same, items of calculation information whose difference falls within a predetermined range.

Thus, even if the antenna panel receives incorrect calculation information, because calculation information is calculated using correct calculation information received from other antenna panels, further transmission of the incorrect calculation information to other antenna panels, specifically, propagation of the incorrect calculation information, is prevented.

Therefore, according to this configuration, even if an abnormality occurs in information transmission performed by an antenna panel, the influence of the abnormality can be prevented from being propagated to the other antenna panels.

In the above-described first aspect, it is preferable that, after two items of the calculation information are received from adjacent antenna panels among the antenna panels, the calculation part perform calculations for the respective items of received calculation information and judge whether two items of calculation information obtained as results of the calculations agree with each other; and, if the two items of calculation information disagree with each other, the transmission part send disagreement information indicating disagreement to the other adjacent antenna panels among the antenna panels and, if the two items of calculation information agree with each other, send this calculation information to the adjacent antenna panels among the antenna panels.

According to this configuration, when two items of calculation information are received from adjacent antenna panels, the calculation part performs calculations for the respective items of received calculation information and judges whether two items of calculation information obtained as the results of the calculations agree with each other, and, if the two items of calculation information disagree with each other, the transmission part sends disagreement information indicating disagreement to the other adjacent antenna panels.

Note that, when the disagreement information is received, the calculation part performs a calculation using the other received calculation information, and calculation information obtained through the calculation is sent to the adjacent antenna panels by the transmission part.

In this way, information is sent to adjacent antenna panels irrespective of whether the two items of calculation information obtained as the results of the calculations agree or disagree; therefore, with this configuration, transmission and reception of information to and from the adjacent antenna panels can be prevented from being interrupted.

In the above-described first aspect, it is preferable that, when the two items of calculation information obtained as the results of the calculations disagree with each other, and third calculation information is then received from another one of the adjacent antenna panels among the antenna panels, the calculation part perform a calculation using the third calculation information and set calculation information via a majority decision; and the transmission part newly send the calculation information set via the majority decision to the adjacent antenna panels among the antenna panels.

According to this configuration, when the two items of calculation information obtained as the results of the calculations disagree with each other, and third calculation information is then received from another one of the adjacent antenna panels, the calculation part performs a calculation using the third calculation information and sets calculation information as the result of the calculations via a majority decision. Then, the transmission part newly sends the calculation information set via the majority-of-three decision to the adjacent antenna panels.

Therefore, with this configuration, it is possible to prevent propagation of incorrect calculation information and to propagate correct calculation information.

According to a second aspect, the present invention provides a phase control method for a phased array antenna that has a configuration in which a plurality of antenna panels in each of which a plurality of antenna elements are arrayed are connected in the form of a plane and that radiates signals in an arrival direction of a pilot signal sent from an electric-power receiving facility (rectenna system), by controlling phases of signals input to and output from the antenna elements, the method including: a first step of receiving, with a reception part provided in each of the antenna panels, calculation information used to calculate phase shifts of signals to be radiated from the antenna elements, from an adjacent antenna panel among the antenna panels, and calculating the phase shifts by using the calculation information; and a second step of sending, with a transmission part provided in each of the antenna panels, the calculation information obtained through the calculation performed in the first step to at least three other adjacent antenna panels among the antenna panels.

Advantageous Effects of Invention

According to the present invention, there is an advantageous effect in that, even if an abnormality occurs in information transmission performed by an antenna panel, the influence of the abnormality can be prevented from being propagated to the other antenna panels.

DESCRIPTION OF EMBODIMENTS

A phased array antenna and a phase control method therefor according to one embodiment of the present invention will be described below with reference to the drawings.

In this embodiment, a description will be given of an example case in which the phased array antenna of the present invention is applied to an SSPS.

Figure 1:
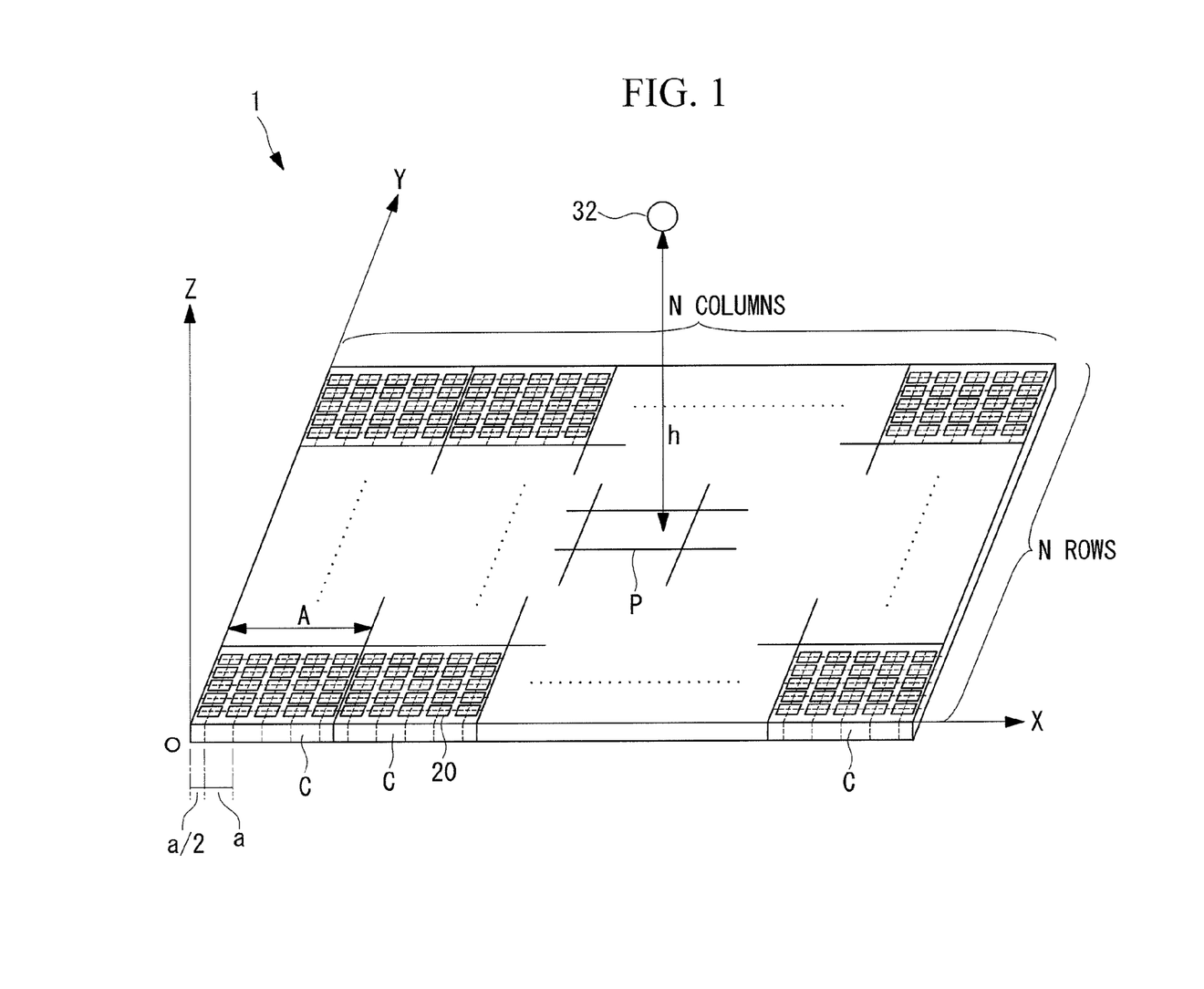
FIG. 1 is a view showing an array of antenna panels and antenna elements in a phased array antenna according to an embodiment of the present invention.

FIG. 1 is a view showing, in outline, the configuration of a phased array antenna 1 according to this embodiment. As shown in FIG. 1, the phased array antenna 1 of this embodiment is provided with a plurality of antenna panels C that are two-dimensionally-arrayed in N rows and N columns on an X-Y plane in an O-XYZ Cartesian coordinate system. The antenna panels C adjacent to each other are connected at connection points (not shown). Each of the antenna panels C is square having a side of A (for example, about 1 meter), for example, and such antenna panels C are connected to each other, thus forming a large-scale phased array antenna 1 of about 2 kilometers square, as a whole.

In each antenna panel C, a plurality of antenna elements 20 are two-dimensionally-arrayed in an X-axis direction and a Y-axis direction with a predetermined distance therebetween. For example, in each antenna panel C, the antenna elements 20 are two-dimensionally-arrayed in the X-axis direction and the Y-axis direction such that the distance therebetween is set to a. Note that the distances between end faces of an antenna panel C and the antenna elements 20 that are closest to the end faces are all set to a/2.

Furthermore, as shown in FIG. 1, when an antenna panel C that serves as a reference among the plurality of antenna panels C in the phased array antenna 1 is referred to as a reference panel P, an instruction transmitting section (instruction transmitting part) 32 is provided at a position a predetermined height h from the surface of the reference panel P. The instruction transmitting section 32 sends a time synchronization pulse to the antenna panels C of the phased array antenna 1 through radio communication.

Furthermore, it is preferable that the height position h at which the instruction transmitting section 32 is provided be set such that phase errors calculated based on the differences in transmission distance of the time synchronization pulse between the reference panel P and the antenna panels C other than the reference panel P fall within a predetermined range. Note that the height position h at which the instruction transmitting section 32 is provided is not particularly limited; however, in this embodiment, the height position h is set to a position at a height of about 1 kilometer from the surface of the reference panel P because the differences in transmission distance of the time synchronization pulse between the reference panel P and the other antenna panels C are reduced as the distance (height) from the surface of the reference panel P is increased.

Figure 2:
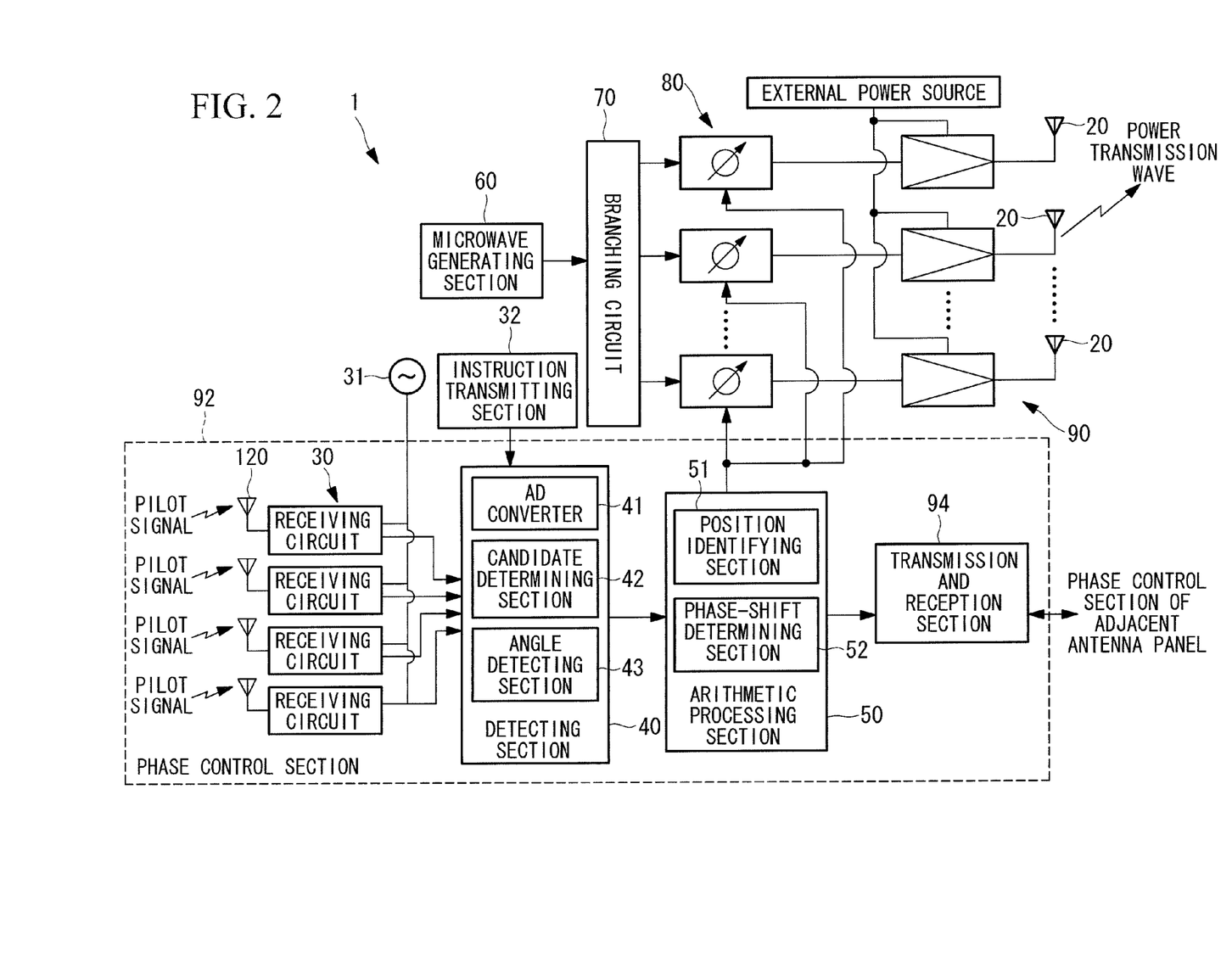
FIG. 2 is a block diagram showing the electrical configuration of the phased array antenna according to the embodiment of the present invention.

Next, the electrical configuration of the phased array antenna 1 of this embodiment will be described with reference to FIG. 2. Note that, in the phased array antenna 1 of this embodiment, a phase control section 92 is provided in each of the antenna panels C.

An oscillator 31 sends, to the respective antenna panels C through radio communication, a reference signal $f_{p+\Delta p}$ that serves as a reference when detecting sections 40 estimate the arrival phases φ at the antenna panels C. Note that a technique for sending a reference signal by means of the oscillator 31 is described in detail in Japanese Unexamined Patent Application, Publication No. 2004-325162, for example. By adopting such a known technique, a reference signal can be sent from the oscillator 31.

The instruction transmitting section 32 outputs a pulse for synchronizing time (time synchronization pulse) to each of the detecting sections 40.

Receiving circuits 30 provided in the phase control section 92 down-convert pilot signals $f_p$ received by receiving antenna elements 120 of each antenna panel C based on the reference signal $f_{p+\Delta p}$ so as to set a predetermined frequency and output down-converted pilot signals $f_p'$ ($=f_{\Delta p}=f_{p+\Delta p}-f_p$) to the detecting section 40. Here, the predetermined frequency is a frequency with which the antenna size falls within a predetermined range. Furthermore, even though the pilot signals $f_p$ are down-converted, the relative phases of the pilot signals $f_p$ received by the receiving circuits 30 of each antenna panel are maintained.

The detecting section 40 detects, for the antenna panel, arrival direction angles θ formed by the antenna panel surface and the arrival directions of the pilot signals in the antenna panel C and arrival phases φ of the pilot signals in the antenna panel C and outputs them to an arithmetic processing section 50. Specifically, the detecting section 40 includes an AD converter 41, a candidate determining section 42, and an angle detecting section 43.

The AD converter 41 uses the time synchronization pulse received from the instruction transmitting section 32 as a trigger to output, to the candidate determining section 42, timing information for detecting the arrival phases φ of the pilot signals $f_p'$, which have been down-converted by the receiving circuits 30 of the antenna panel C.

The candidate determining section 42 detects, for the antenna panel C, the arrival phases φ of the pilot signals $f_p'$ based on the pilot signals $f_p'$, which have been down-converted based on the reference signal $f_{p+\Delta p}$, and the timing information received from the AD converter 41. Specifically, the candidate determining section 42 detects the arrival phases φ of the pilot signals $f_p'$ from the position of the reference signal at the time point when the timing information is received. Furthermore, the candidate determining section 42 estimates, for the antenna panel C, candidates R for the position of the antenna panel C (hereinafter, referred to as "panel position") based on the arrival phases φ of the pilot signals $f_p$. The candidates R for the position of the antenna panel C are position candidates corresponding to integer multiples of the wavelength. The candidate determining section 42 outputs the arrival phases φ and the candidates R for the panel position to the arithmetic processing section 50.

Figure 3:
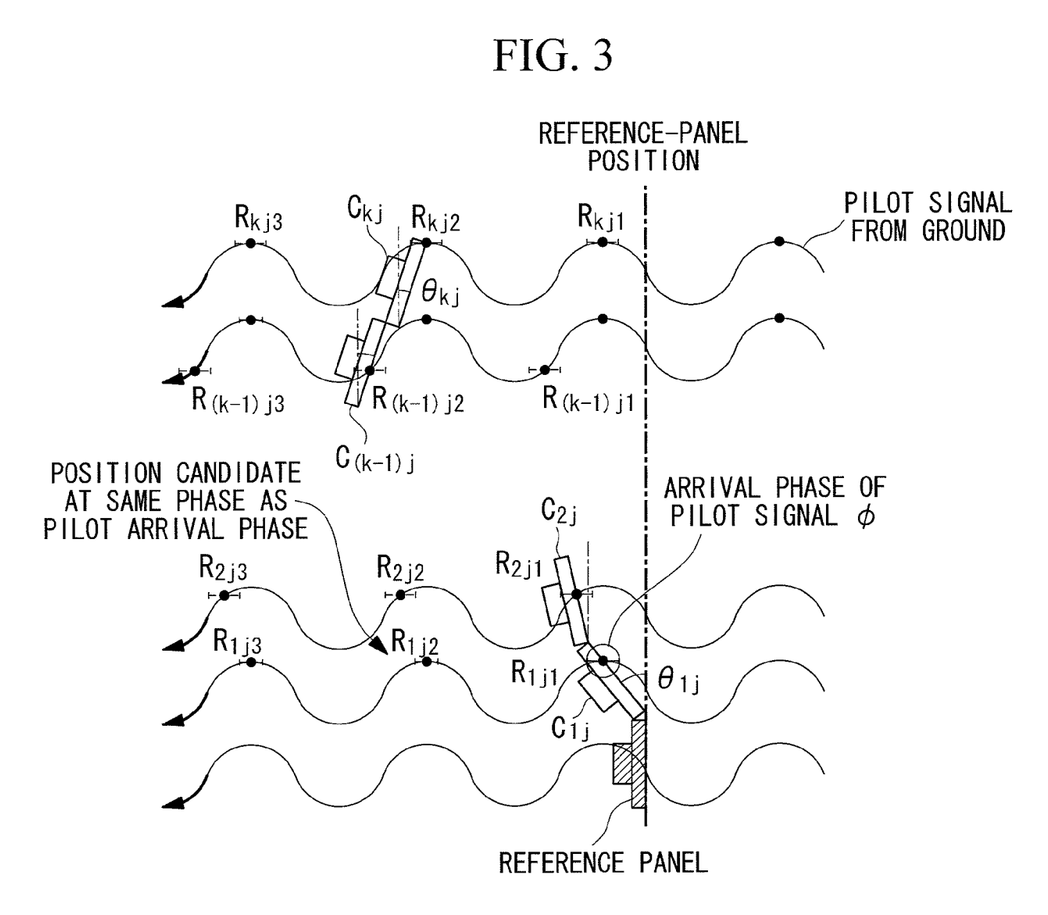
FIG. 3 is a view showing part of the phased array antenna shown in FIG. 1.

FIG. 3 shows how the plurality of antenna panels C receive the pilot signals from the ground. For example, in an antenna panel $C_{1j}$ that is located adjacent to the reference panel P, the candidate determining section 42 detects that the pilot signal $f_p$ has been received at the peak of its waveform based on information of an arrival phase $\phi_{1j}$ of the pilot signal $f_p$ and estimates $R_{1j1}$, $R_{1j2}$, and $R_{1j3}$ at which the phase of the pilot signal $f_p$ is shifted by 360 degrees, as candidates R for the panel position.

The angle detecting section 43 is provided with an RF interferometer and calculates the directions toward an electric-power receiving facility (rectenna system) 102 (for example, see FIG. 8) that has sent the pilot signals, by measuring the differences between the phases of the pilot signals $f_p$ received by the plurality of receiving antenna elements 120 provided in the antenna panel C. Furthermore, the angle detecting section 43 estimates, for the antenna panel C, arrival direction angles θ that indicate the directions toward the electric-power receiving facility (rectenna system) 102 and outputs them to the arithmetic processing section 50.

The arithmetic processing section 50 is provided with a microcomputer, performs phase control processing based on the received arrival direction angles θ, arrival phases φ, and candidates R for the panel position, and received phase information (information indicating phase shifts of power transmission microwaves to be radiated from the plurality of antenna elements 20 arrayed on the antenna panel C) of adjacent antenna panels C, thereby calculating phase shifts of power transmission microwaves to be sent from the antenna elements 20, and outputs phase information indicating the phase shifts to variable phase shifters 80. Note that the phase control processing is performed based on the arrival phases φ of the pilot signals $f_p$ detected in each antenna panel C, thereby aligning the phase planes of the power transmission microwaves to be output from all the antenna elements 20.

Specifically, the arithmetic processing section 50 includes a position identifying section 51 and a phase-shift determining section 52.

The position identifying section 51 identifies the position of the antenna panel with respect to the reference panel P among the plurality of antenna panels based on the arrival phases φ and the arrival direction angles θ. Furthermore, the reference panel P is set in a fixed manner.

Here, an example case of estimating the position of the antenna panel $C_{1j}$, which is adjacent to the reference panel P, will be described with reference to FIG. 3. The position identifying section 51 selects a panel position located at an arrival direction angle $\theta_{1j}$ with respect to the reference panel P from the panel position candidates R (for example, $R_{1j1}$, $R_{1j2}$, $R_{1j3}$, etc.), which are estimated when the arrival phase $\phi_{1j}$ at the antenna panel $C_{1j}$ is calculated, and identifies the selected panel position $R_{1j1}$ as the position of the antenna panel $C_{1j}$.

The position identifying section 51 identifies the panel position of the antenna panel C in this way and outputs information of the panel position to the phase-shift determining section 52. Note that, here, it is assumed that the error of the arrival direction angle θ at the antenna panel is smaller than the wavelength.

The phase-shift determining section 52 determines the phase shifts of signals to be radiated from the antenna elements 20, based on the information of the panel position identified by the position identifying section 51. For example, the phase-shift determining section 52 determines the phase shifts of power transmission microwaves to be radiated from the antenna elements 20, based on the phase information of other adjacent antenna panels C.

Furthermore, after determining the phase shifts of the power transmission microwaves, the phase-shift determining section 52 outputs information of the phase shifts to the variable phase shifters 80 corresponding to the antenna panel C.

A transmitting and receiving section 94 receives phase information calculated in an adjacent antenna panel C from that antenna panel C and sends phase information obtained as the result of calculation in the arithmetic processing section 50 to the other adjacent antenna panels C. Note that, in this embodiment, the phase information is sent to and received from other antenna panels C that are adjacent to each antenna panel C, which is square, on the sides thereof.

On the other hand, a microwave generating section 60 generates a reference microwave signal and outputs it to a branching circuit 70. The branching circuit 70 branches the received reference microwave signal and outputs the branched signals to the variable phase shifters 80, which are provided in correspondence with the antenna elements 20.

The variable phase shifters 80 cause the reference-phase power transmission microwaves received from the branching circuit 70 to shift their phases based on the respective phase information received from the arithmetic processing section 50, and output them to power amplifiers 90.

The power amplifiers 90 are provided in correspondence with the antenna elements 20, amplify electric power supplied from an external power source (space solar power generating section) into power transmission microwaves having the phases and the frequencies of the signals output from the variable phase shifters 80, and output them to the antenna elements 20.

The antenna elements 20 radiate the power transmission microwaves having the amplified electric power and the phase differences toward the electric-power receiving facility (rectenna system) 102 (see FIG. 8).

Here, in a case where the phase information is sent to two or fewer of the adjacent antenna panels C, if a failure occurs in a communication function of an antenna panel C, specifically, if a failure occurs in the transmitting and receiving section 94, there is a possibility that the phase information will not be sent to an antenna panel C that is adjacent to the antenna panel C having a failure in the communication function and that has no failure in the communication function.

Figure 4:
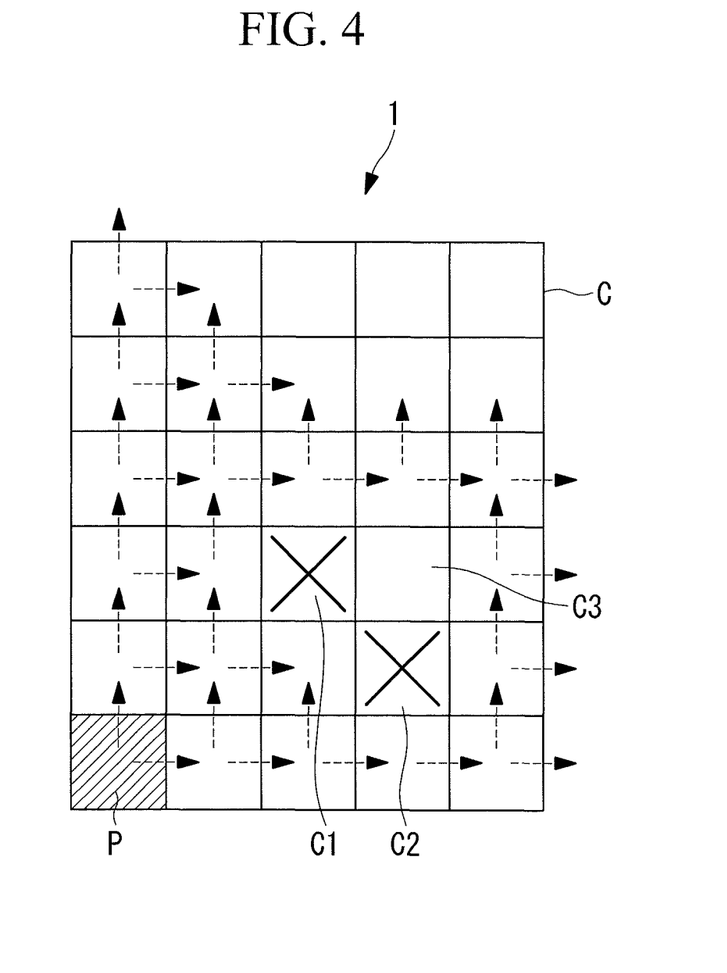
FIG. 4 is a schematic diagram showing an example case in which phase information is sent from an antenna panel to two other adjacent antenna panels.

FIG. 4 shows an example case in which the phase information is sent to two adjacent antenna panels C.

Antenna panels C1 and C2 shown in FIG. 4 are antenna panels C in which a failure has occurred in their communication functions, and the arrows shown in FIG. 4 indicate the directions in which the phase information is sent. As shown in FIG. 4, even though the phase information is sequentially sent from the reference panel P to adjacent antenna panels C, the phase information is not sent to an antenna panel C3 that is adjacent to the antenna panels C1 and C2.

Therefore, the transmitting and receiving section 94 of this embodiment sends the phase information calculated by the arithmetic processing section 50 to at least three of the adjacent antenna panels C. By doing so, redundant transmission paths in the antenna panels C are provided, and thus the phase information is sent by bypassing the antenna panels C having a failure in their communication functions; therefore, it is possible to avoid a situation in which the phase information will not be sent to an antenna panel C having no failure in the communication function.

Figure 5:
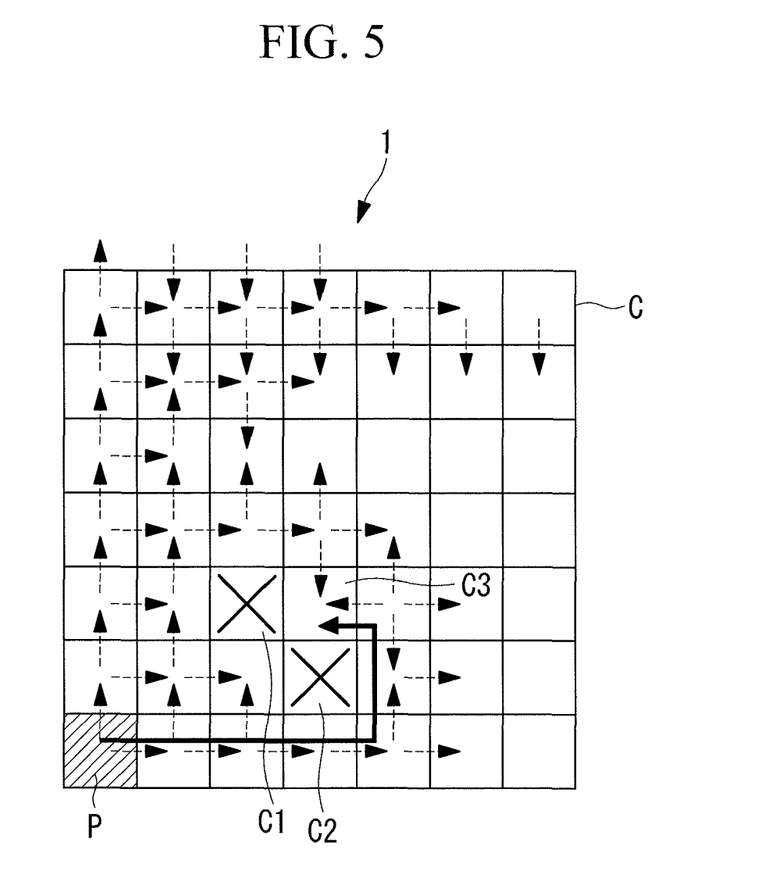
FIG. 5 is a schematic diagram showing an example case in which the phase information is sent from an antenna panel to three other adjacent antenna panels, according to the embodiment of the present invention.

FIG. 5 shows an example case in which the phase information is sent to three adjacent antenna panels C. As shown in FIG. 5, by sending the phase information to three adjacent antenna panels C, the phase information is sent to the antenna panel C3, which has no failure in the communication function, while bypassing the antenna panel C2, which has a failure in the communication function.

Note that, in FIG. 5, the three adjacent antenna panels C to which the phase information is sent do not include the antenna panel C from which the phase information has been received. Specifically, if the antenna panel C also sends the phase information obtained as the result of calculation to the antenna panel C from which the phase information has been received, the antenna panel C sends the phase information to four adjacent antenna panels C.

Furthermore, due to a failure in the transmitting and receiving section 94 or the arithmetic processing section 50 included in each antenna panel C, incorrect phase information may be sent to other adjacent antenna panels C. In this case, there is a possibility that the incorrect phase information is propagated to the other panels.

Therefore, the arithmetic processing section 50 of this embodiment receives the phase information from two or more of the adjacent antenna panels C, then performs multiple calculations for the respective items of phase information, and sets the phase information via a majority decision. Then, the transmitting and receiving section 94 sends the phase information set via a majority decision to the adjacent antenna panels C. Specifically, if differing items of phase information are obtained as the results of the calculations, identical items of phase information that are more numerous are set as the correct phase information. Note that the identical items of phase information include, in addition items of phase information that are exactly the same, items of phase information whose difference falls within a predetermined range.

In this way, even if the antenna panel C receives incorrect phase information from another antenna panel C, because the phase information is calculated using correct phase information received from other antenna panels C, further transmission of the incorrect phase information to other antenna panels C, in other words, propagation of the incorrect phase information, is prevented.

Figure 6:
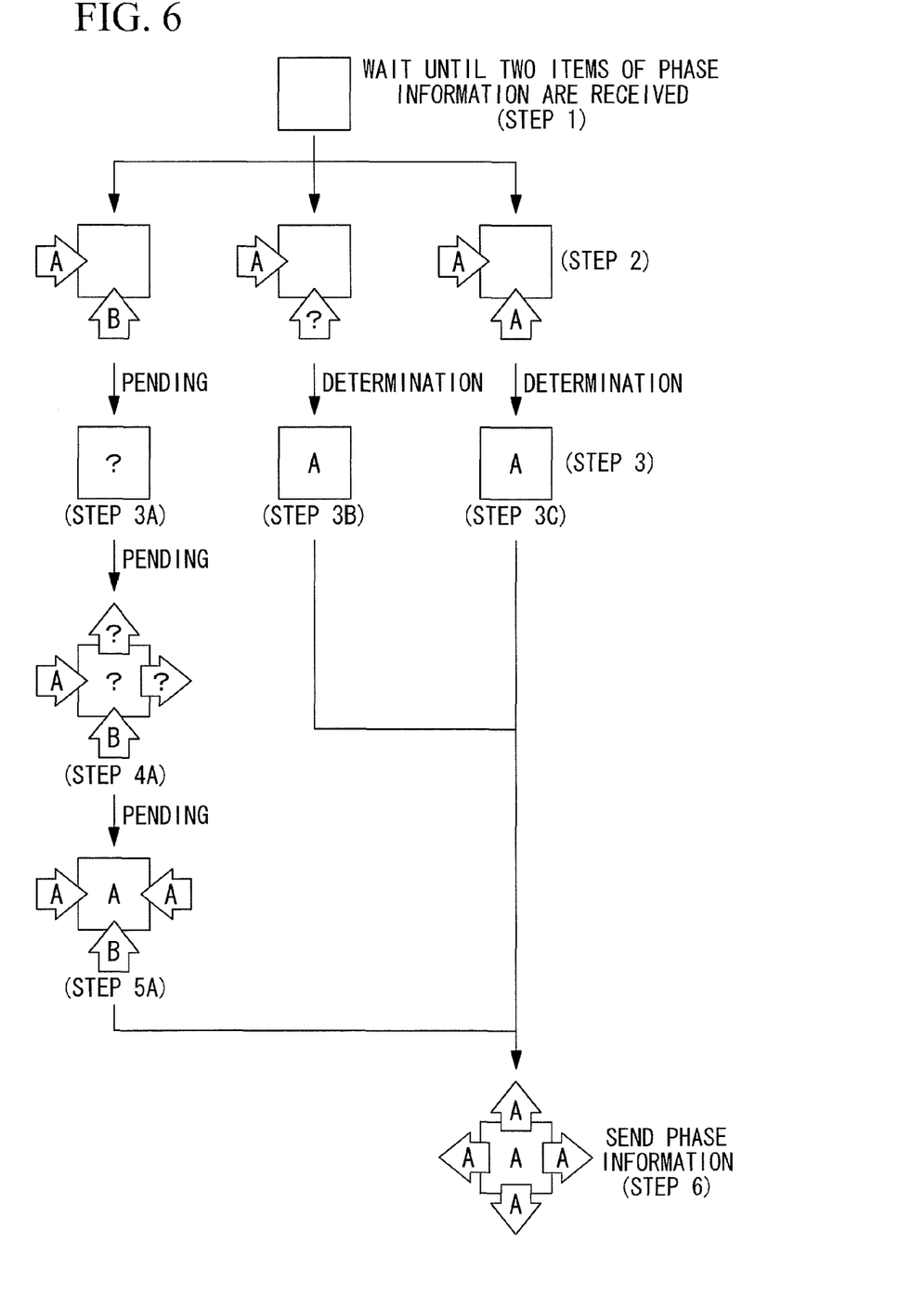
FIG. 6 is a schematic diagram showing the flow of processing of a communication algorithm according to the embodiment of the present invention.

FIG. 6 is a schematic diagram showing the flow of processing of a communication algorithm according to this embodiment. Note that, in FIG. 6, it is assumed that "A" indicates correct phase information, "B" indicates incorrect phase information, and phase information obtained as the result of calculation using the correct phase information "A" is set to "A". However, in practice, there is a case in which the phase information obtained as the result of calculation differs from the received phase information because the phase information is obtained as the result of calculation using the phase information received from another antenna panel C.

Note that, in the reference panel P and the antenna panels C that are adjacent to the reference panel P and that cannot receive two or more items of phase information, the phase information is calculated without performing the processing of the communication algorithm.

In the communication algorithm, first, the arithmetic processing section 50 waits until the phase information is received from two of the adjacent antenna panels C (Step 1).

Then, after the phase information is received from two of the adjacent antenna panels C (Step 2), the arithmetic processing section 50 performs calculations for the respective items of received phase information (Step 3A, 3B, and 3C) and judges whether two items of phase information obtained as the results of the calculations agree with each other.

If the two items of phase information obtained as the results of the calculations disagree with each other, specifically, if the correct phase information "A" and the incorrect phase information "B" have been received, the arithmetic processing section 50 suspends setting of the phase information (Step 3A). Then, the transmitting and receiving section 94 sends disagreement information ("?" in FIG. 6) indicating disagreement, to the other adjacent antenna panels C (Step 4A).

Then, when third phase information is subsequently received from another one of the adjacent antenna panels C, the arithmetic processing section 50 performs a calculation using the third phase information and sets the phase information via a majority decision (Step 5A).

Then, the transmitting and receiving section 94 newly sends the phase information set via a majority decision to the adjacent antenna panels C (Step 6).

On the other hand, if the transmitting and receiving section 94 receives the disagreement information "?", the arithmetic processing section 50 performs a calculation using the other received phase information "A" (Step 3B). Then, the transmitting and receiving section 94 sends phase information "A" obtained as the result of the calculation using the phase information "A" to the adjacent antenna panels C (Step 6).

Furthermore, if two items of phase information "A" obtained as the results of calculations agree with each other, specifically, if two items of correct phase information "A" have been received (Step 3C), the two items of phase information obtained as the results of the calculations performed for the respective items of phase information by the arithmetic processing section 50 agree with each other. Thus, the transmitting and receiving section 94 sends the agreeing phase information "A" to the adjacent antenna panels C (Step 6).

FIGS. 7A to 7D are schematic diagrams showing a specific example of processing of the communication algorithm of this embodiment. In the figures, "A" displayed on the antenna panels C indicates antenna panels C that have sent correct phase information, and "?" indicates antenna panels C that are in a pending state. Furthermore, "waiting" indicates antenna panels C that are in a waiting state, waiting for the phase information, and "B" indicates antenna panels C that have sent incorrect phase information.

Figure 7A:
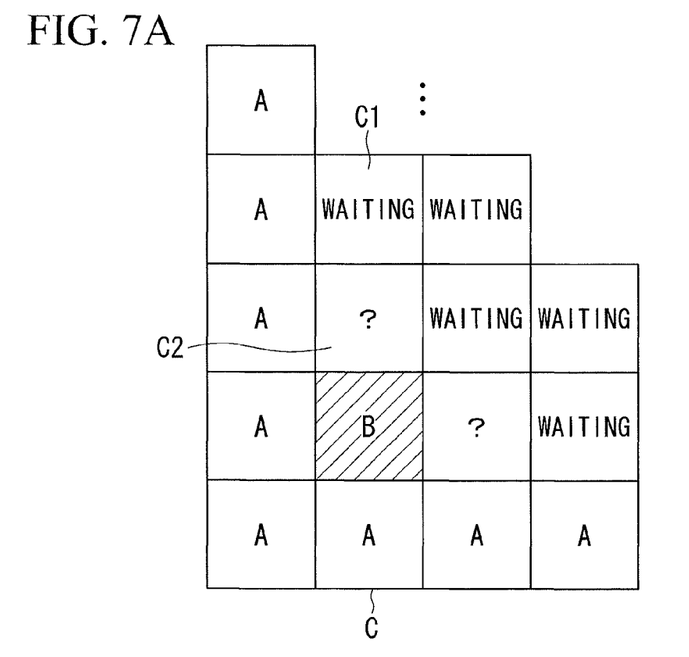
FIG. 7A is a schematic diagram showing an initial state in a specific example of processing of the communication algorithm according to the embodiment of the present invention.

FIG. 7A shows an example initial state.

Figure 7B:
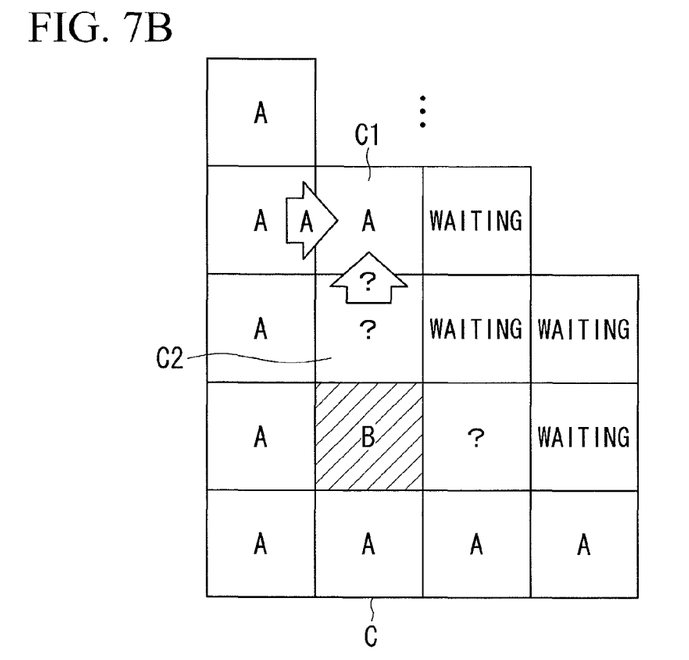
FIG. 7B is a schematic diagram showing a state in which an antenna panel C1 that was in a waiting state has received phase information "A" and phase information "?" and has set the phase information "A" as the result of calculation, in the specific example of processing of the communication algorithm according to the embodiment of the present invention.

FIG. 7B shows a state in which an antenna panel C1 that was in a waiting state has received the phase information "A" and the phase information "?" and has set the phase information "A" as the result of calculation.

Figure 7C:
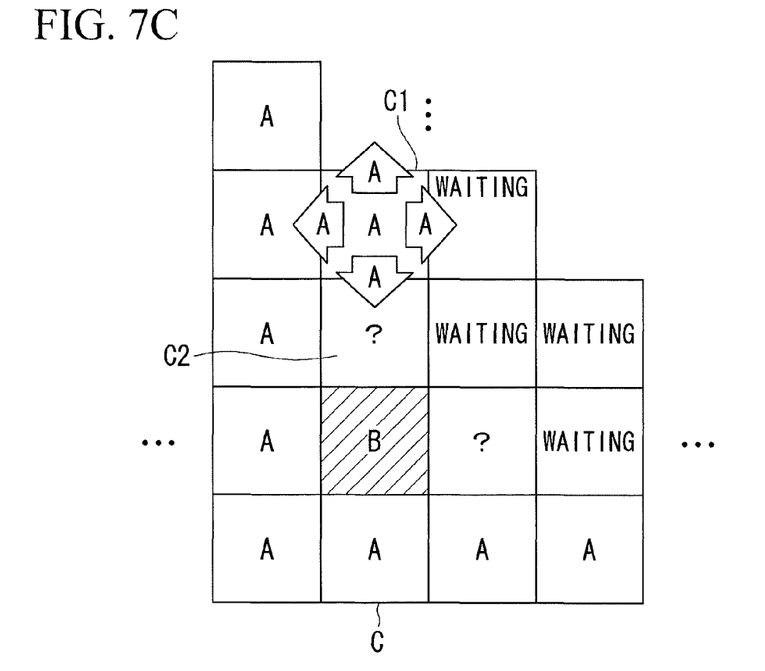
FIG. 7C is a schematic diagram showing a state in which the antenna panel C1 has sent the phase information "A" to adjacent antenna panels C, in the specific example of processing of the communication algorithm according to the embodiment of the present invention.

FIG. 7C shows a state in which the antenna panel C1 has sent the phase information "A" to the adjacent antenna panels C.

Figure 7D:
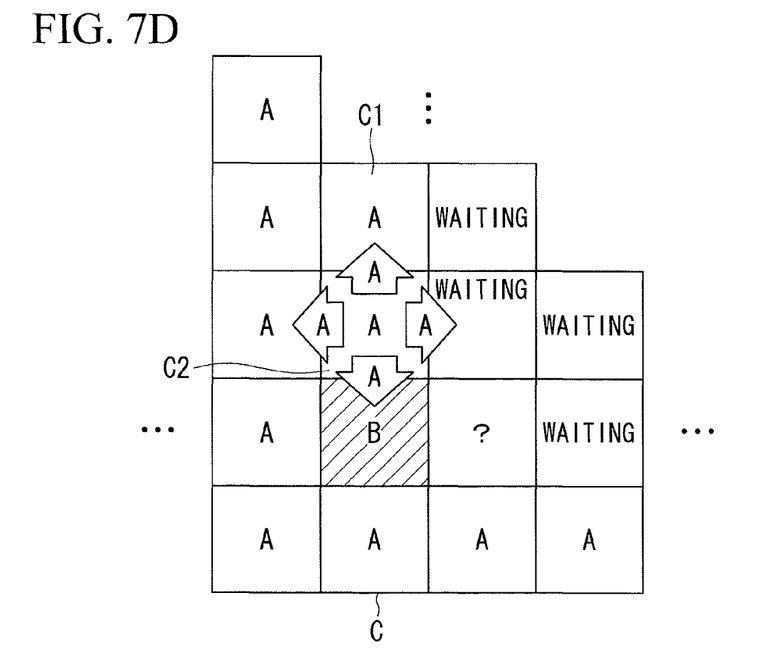
FIG. 7D is a schematic diagram showing a state in which an antenna panel C2 that was in a pending state has set the phase information "A" as the result of calculation due to the phase information "A" received from the antenna panel C1 and has sent the set phase information "A" to adjacent antenna panels C, in the specific example of processing of the communication algorithm according to the embodiment of the present invention.

FIG. 7D shows a state in which an antenna panel C2 that was in a pending state has set the phase information "A" as the result of calculation due to the phase information "A" received from the antenna panel C1 and has sent the set phase information "A" to the adjacent antenna panels C.

As described above, according to the phased array antenna 1 of this embodiment, the arithmetic processing section 50, which is provided in each of the antenna panels C, calculates the phase shifts of power transmission microwaves to be radiated from the antenna elements 20. Then, phase information indicating the phase shifts calculated in the arithmetic processing section 50 is sent to at least three of the adjacent antenna panels C by the transmitting and receiving section 94, which is provided in each of the antenna panels C.

Therefore, according to the phased array antenna 1 of this embodiment, even if an abnormality occurs in transmission of the phase information performed by an antenna panel C, the influence of the abnormality can be prevented from being propagated to the other antenna panels C.

Furthermore, according to the phased array antenna 1 of this embodiment, when the antenna panel C receives the phase information from two or more of the adjacent antenna panels C, the arithmetic processing section 50 performs multiple calculations for the respective items of received phase information and sets the phase information as the result of the calculations via a majority decision, and the transmitting and receiving section 94 sends the phase information set via a majority decision to the adjacent antenna panels C.

Therefore, according to the phased array antenna 1 of this embodiment, because it is possible to prevent further transmission of incorrect phase information to other antenna panels C, specifically, propagation of incorrect phase information, even if an abnormality occurs in transmission of the phase information performed by an antenna panel C, the influence of the abnormality can be prevented from being propagated to the other antenna panels C.

Furthermore, according to the phased array antenna 1 of this embodiment, when two items of phase information are received from adjacent antenna panels C, the arithmetic processing section 50 performs calculations for the respective items of received phase information and judges whether two items of phase information obtained as the results of the calculations agree with each other. If the two items of phase information disagree, the transmitting and receiving section 94 sends the disagreement information, which indicates disagreement, to the other adjacent antenna panels C.

Therefore, according to the phased array antenna 1 of this embodiment, because information is sent to adjacent antenna panels C irrespective of whether two items of phase information obtained as the results of the calculations agree or disagree, transmission and reception of information to and from the adjacent antenna panels C can be prevented from being interrupted.

Furthermore, according to the phased array antenna 1 of this embodiment, when two items of phase information obtained as the results of the calculations disagree with each other, and third phase information is then received from another one of the adjacent antenna panels C, the arithmetic processing section 50 performs a calculation using the third phase information and sets phase information as the result of the calculations via a majority decision, and the transmitting and receiving section 94 newly sends the phase information set via a majority decision to the adjacent antenna panels C.

Therefore, according to the phased array antenna 1 of this embodiment, it is possible to prevent the propagation of incorrect phase information and to propagate correct phase information.

Although the present invention has been described by using the above-described embodiment, the technical scope of the present invention is not limited to the range described in the embodiment. Various modifications and improvements can be added to the above-described embodiment without departing from the scope of the invention, and a configuration obtained by adding such modifications and improvements is also encompassed in the technical scope of the present invention.

For example, in the above-described embodiment, although a description has been given of a configuration in which phase information is sent to adjacent antenna panels C, and calculations are performed by using received phase information, the present invention is not limited thereto, and it is possible to adopt a configuration in which the position information indicating the position of the antenna panel C and the angle information indicating the angle of the antenna panel C, which are calculated based on the pilot signals, are sent to adjacent antenna panels C, and the phase shifts of power transmission microwaves to be radiated from the antenna elements 20 are calculated by using the received position information and angle information.

Furthermore, in the above-described embodiment, a description has been given of a configuration in which the phase information is sent to and received from other antenna panels C that are adjacent to each antenna panel C, which is square, on the sides thereof; however, the present invention is not limited thereto, and it is possible to adopt a configuration in which the phase information is sent to and received from other antenna panels C that are adjacent to the antenna panel C at the corners thereof. With this configuration, the phase information can be sent to five or more adjacent antenna panels C.

Furthermore, in the above-described embodiment, a description has been given of a configuration in which the antenna panels C each have a square shape; however, the present invention is not limited thereto, and it is possible to adopt a configuration in which the antenna panels C each have a polygonal shape having five sides or more. With this configuration, the phase information can be sent to five or more adjacent antenna panels C.

REFERENCE SIGNS LIST 1 phased array antenna
50 arithmetic processing section
51 position identifying section
52 phase-shift determining section
92 phase control section
94 transmission and reception section
120 electric-power receiving facility (rectenna system)
C antenna panels

The invention claimed is:

1. A phased array antenna comprising:
a plurality of antenna panels;
a plurality of antenna elements arrayed in each of the plurality of antenna panels, the plurality of antenna elements being connected in a form of a plane, the plurality of antenna elements radiating signals in an arrival direction of a pilot signal sent from an electric-power receiving facility, a phase of signals output from the plurality of antenna elements being controllable;
an arithmetic processing section provided in each of the plurality of antenna panels, the arithmetic processing section determining a phase shift of the signals radiated from a respective one of the plurality of antenna elements based on a position of the respective one of the plurality of antenna panels, and an adjacent panel phase shift sent from an adjacent one of the plurality of antenna panels;
a reception part in each of the plurality of antenna panels to receive the adjacent panel phase shift determined by another arithmetic processing section of an adjacent one of the plurality of antenna panels; and
a transmission part in each of the plurality of antenna panels to send the phase shift determined by the arithmetic processing section to at least three adjacent ones of the plurality of antenna panels.

2. The phased array antenna according to claim 1,
wherein, after the adjacent panel phase shift is received from two or more adjacent ones of the plurality of antenna panels, the arithmetic processing section is adapted to determine the phase shift based on adjacent panel phase shifts from each of the two or more adjacent ones of the plurality of antenna panels, and if a plurality of different possible phase shifts are determined, the arithmetic processing section determines the phase shift based on the majority of different possible phase shifts; and
the transmission part is adapted to send the determined phase shift to the two or more adjacent ones of the plurality of antenna panels.

3. A phased array antenna comprising:
a plurality of antenna panels;
a plurality of antenna elements arrayed in each of the plurality of antenna panels, the plurality of antenna elements being connected in a form of a plane, the plurality of antenna elements radiating signals in an arrival direction of a pilot signal sent from an electric-power receiving facility, a phase of signals output from the plurality of antenna elements being controllable;
an arithmetic processing section provided in each of the plurality of antenna panels, the arithmetic processing section determining a phase shift of the signals radiated from a respective one of the plurality of antenna elements based on a position of the respective one of the plurality of antenna panels, and an adjacent panel phase shift sent from an adjacent one of the plurality of antenna panels;
a reception part in each of the plurality of antenna panels to receive the adjacent panel phase shift determined by another arithmetic processing section of an adjacent one of the plurality of antenna panels; and
a transmission part in each of the plurality of antenna panels to send the phase shift determined by the arithmetic processing section to at least three adjacent ones of the plurality of antenna panels;
wherein, after the adjacent panel phase shift is received from two or more adjacent ones of the plurality of antenna panels, the arithmetic processing section is adapted to determine the phase shift based on adjacent panel phase shifts from each of the two or more adjacent ones of the plurality of antenna panels, and if a plurality of different possible phase shifts are determined, the arithmetic processing section determines the phase shift based on the majority of different possible phase shifts;
wherein the transmission part is adapted to send the determined phase shift to the two or more adjacent ones of the plurality of antenna panels;
wherein, after two adjacent panel phase shifts are received from two different adjacent ones of the plurality of antenna panels, the arithmetic processing section is adapted to set a new phase shift when the two different adjacent ones of the plurality of antenna panels agree with each other; and
wherein the transmission part is adapted to sends phase disagreement information indicating disagreement between the phase shift and the adjacent panel phase shift of the adjacent ones of the plurality of antenna panels when the adjacent panel phase shift of the adjacent ones of the plurality of antenna panels disagree with each other, and to send the phase shift to the adjacent ones of the plurality of antenna panels when the phase shifts of the two different adjacent ones of the plurality of antenna panels agree with each other.

4. The phased array antenna according to claim 3,
wherein, when the two adjacent panel phase shifts of adjacent ones of the plurality of antenna panels disagree with each other, the reception part is adapted to then receive a third adjacent panel phase shift from a third adjacent one of the plurality of antenna panels,
wherein the arithmetic processing section is adapted to determine the phase shift based additionally on the third adjacent panel phase shift, and determines the phase shift based on a majority decision between the first, second and third adjacent panel phase shifts; and wherein the transmission part is adapted to newly send the phase shift set via the majority decision to the adjacent ones of the plurality of antenna panels.

5. A phase control method for a phased array antenna that has a configuration in which a plurality of antenna panels in each of which a plurality of antenna elements are arrayed are connected in the form of a plane and that radiates signals in an arrival direction of a pilot signal sent from an electric-power receiving facility, by controlling phases of signals input to and output from the antenna elements, the method comprising:
- receiving, with a reception part provided in each of the plurality of antenna panels, adjacent panel phase shift information used to determine a phase shift of the signals to be radiated from the antenna elements, from an adjacent one of the plurality of antenna panels;
- calculating the phase shift of the signals to be radiated from the antenna elements based on the received adjacent panel phase shift information;
- radiating the signals from the antenna elements at a phase corresponding to the determined phase shift; and
- sending, with a transmission part provided in each of the antenna panels, the determined phase shift to at least three other adjacent ones of the plurality of antenna panels.

* * * * *